US011875583B2

(12) United States Patent
Yang et al.

(10) Patent No.: US 11,875,583 B2
(45) Date of Patent: Jan. 16, 2024

(54) DATASET GENERATION METHOD FOR SELF-SUPERVISED LEARNING SCENE POINT CLOUD COMPLETION BASED ON PANORAMAS

(71) Applicant: DALIAN UNIVERSITY OF TECHNOLOGY, Liaoning (CN)

(72) Inventors: Xin Yang, Liaoning (CN); Tong Li, Liaoning (CN); Baocai Yin, Liaoning (CN); Zhaoxuan Zhang, Liaoning (CN); Boyan Wei, Liaoning (CN); Zhenjun Du, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 254 days.

(21) Appl. No.: 17/533,878

(22) Filed: Nov. 23, 2021

(65) Prior Publication Data
US 2023/0094308 A1   Mar. 30, 2023

(30) Foreign Application Priority Data
Sep. 30, 2021   (CN) .......................... 202111163824.7

(51) Int. Cl.
*G06T 7/50* (2017.01)
*G06V 20/64* (2022.01)
*G06T 3/00* (2006.01)

(52) U.S. Cl.
CPC .......... *G06V 20/647* (2022.01); *G06T 3/0062* (2013.01); *G06T 7/50* (2017.01); *G06T 2207/10028* (2013.01)

(58) Field of Classification Search
None
See application file for complete search history.

(56) References Cited

U.S. PATENT DOCUMENTS

2015/0170405 A1\* 6/2015 Hu .................. G06T 15/205
345/427

OTHER PUBLICATIONS

Dai et al., "Neural Point Cloud Rendering via Multi-Plane Projection," IEEE/CVF Conference on Computer Vision and Pattern Recognition (CVPR), pp. 7827-7836 (Year: 2020).\*

(Continued)

*Primary Examiner* — Vincent Rudolph
*Assistant Examiner* — Nicholas Crespo Stazer
(74) *Attorney, Agent, or Firm* — Muncy, Geissler, Olds & Lowe, P.C.

(57) ABSTRACT

The present invention belongs to the technical field of 3D reconstruction in the field of computer vision, and provides a dataset generation method for self-supervised learning scene point cloud completion based on panoramas. Pairs of incomplete point cloud and target point cloud with RGB information and normal information can be generated by taking RGB panoramas, depth panoramas and normal panoramas in the same view as input for constructing a self-supervised learning dataset for training of the scene point cloud completion network. The key points of the present invention are occlusion prediction and equirectangular projection based on view conversion, and processing of the stripe problem and point-to-point occlusion problem during conversion. The method of the present invention includes simplification of the collection mode of the point cloud data in a real scene; occlusion prediction idea of view conversion; and design of view selection strategy.

1 Claim, 3 Drawing Sheets

(56) References Cited

OTHER PUBLICATIONS

Hsu et al., "Moving in a 360 world: Synthesizing panoramic parallaxes from a single panorama," arXiv preprint arXiv:2106.10859 (Year: 2021).*

* cited by examiner

DATASET GENERATION METHOD FOR SELF-SUPERVISED LEARNING SCENE POINT CLOUD COMPLETION BASED ON PANORAMAS

TECHNICAL FIELD

The present invention belongs to the field of 3D reconstruction in the field of computer vision, and particularly realizes generation of a dataset applicable to training of a scene point cloud completion network with panoramas as input through self-supervised learning.

BACKGROUND

In the process of collecting 3D scenes, some occlusion areas exist inevitably. How to recover incomplete information from the occlusion areas has become an active research field in recent years.

However, now there are two key problems in the scene-level point cloud reconstruction method. Firstly, in complex scenes, it is difficult for a robot to move flexibly, and multi-view collection is time-consuming, laborious, and hard to guarantee the effect of global scene reconstruction. Secondly, in an open environment, indoor scene types are diverse, and it is difficult to obtain sufficient data for supervised training. Thus, the traditional scene reconstruction methods have poor adaptability and are difficult to reconstruct real point cloud scenes with good quality. Based on the above two problems, a dataset generation method for self-supervised learning scene point cloud completion based on panoramas is proposed.

This description is mainly introduced from two aspects of scene point cloud datasets and panorama scene reconstruction.

(a) Scene Point Cloud Datasets

Considering that there is no special dataset for scene point cloud completion task, some existing datasets containing scene point cloud are introduced, such as 2D-3D-S, ScanNet v2 and Matterport3D. However, due to the difficulty of collection for real scene point cloud data, the amount of data used for supervised training is limited. Moreover, in order to apply to the scene point cloud completion task, a method for generating an incomplete area simulating real scene occlusion should be designed separately.

The 2D-3D-S dataset provides 270 indoor point cloud construction scenes distributed in 6 different areas. Images and point cloud are subjected to semantic annotation at the instance level, which can be used for semantic segmentation and instance segmentation tasks. Meanwhile, the dataset also provides ground truth of the surface normal vector.

The ScanNet v2 dataset provides 1513 indoor point cloud construction scenes, including semantic and instance level annotation, which can be used for semantic segmentation and instance segmentation tasks of the images and the point cloud and can apply to scene recognition tasks. 1201 scenes are used for training, and 312 scenes are used for validation.

The Matterport3D dataset collects 194400 RGBD images from 90 teaching building scenes, and generates 10800 panoramas and corresponding 3D scenes by splicing. Instance-level semantic annotation is conducted in each scene, which can be used for semantic segmentation, instance segmentation and surface normal vector estimation of the images and the point cloud. 61 teaching building scenes are used for training, 11 teaching building scenes are used for validation and 18 teaching building scenes are used for test.

(b) Panorama Scene Reconstruction

The core idea of the work (Noise-resilient reconstruction of panoramas and 3D scenes using robot-mounted unsynchronized commodity RGB-D cameras) published in ACM-TOG in 2020 is to realize 3D reconstruction of a large indoor scene by constructing panoramas. The work is mainly divided into two parts. The first part is the construction of the panoramas, and the second part is the integration of the panoramas, to achieve 3D reconstruction of indoor scenes through several panoramas. However, due to the limited view of the panoramas, some areas are occluded, and the reconstructed scene point cloud has many incomplete areas, which are not refined enough.

The core idea of the work (Indoor Panorama Planar 3D Reconstruction via Divide and Conquer) published in CVPR in 2021 is indoor panorama planar 3D reconstruction, and generally adopts the idea of divide and conquer. Firstly, pixels are divided according to planar direction estimation of the pixels, then the task of plane clustering is completed in each plane direction group through an instance segmentation module, and finally, indoor panorama planar 3D reconstruction is conducted by a planar reconstruction method. However, the work mainly reconstructs the plane parallel or perpendicular to the direction of gravity, which is far from the reconstruction of the whole interior scene.

The core idea of the work (Pano2Scene: 3D Indoor Semantic Scene Reconstruction from a Single Indoor Panorama Image) published in BMVC in 2020 is 3D indoor semantic scene reconstruction from a single indoor panorama image, mainly including three parts. The first part includes depth estimation of panorama and instance segmentation of panorama; the second part is 3D scene layout estimation; the third part is object shape completion; and finally, the reconstructed 3D indoor semantic scene point cloud is outputted. However, the work is mainly the object completion constrained by the scene layout, excluding edge areas such as walls, ceilings and floor, and without considering the relationship between objects, causing the lack of integrity.

SUMMARY

With respect to the problem of scarcity of datasets in the field of scene point cloud completion, the present invention proposes a dataset generation method for self-supervised learning scene point cloud completion based on panoramas. Pairs of incomplete point cloud and target point cloud with RGB information and normal information can be generated by taking RGB panoramas, depth panoramas and normal panoramas in the same view as input for constructing a self-supervised learning dataset for training of the scene point cloud completion network. The key points of the present invention are occlusion prediction and equirectangular projection based on view conversion, and processing of the stripe problem and point-to-point occlusion problem during conversion.

The technical solution of the present invention is as follows:

A dataset generation method for self-supervised learning scene point cloud completion based on panoramas specifically comprises the following steps:

Step 1: Generating Initial Point Cloud from a Panorama Under a Specific View 1.1) Introducing a sphere to represent a three-dimensional world, and representing the coordinates in x, y and z directions by longitude and latitude, wherein the radius r of the sphere represents a depth value; assuming that the length of a depth panorama $D_1$ corresponds to the range of 360° (−180° to 180°) in a horizontal direction of a scene, and the width of the depth panorama $D_1$ corresponds to the range of 180° (−90° to 90°) in a vertical direction; representing the coordinate of each pixel of the depth panorama $D_1$ with longitude and latitude, wherein the radius of a point in the sphere corresponding to each pixel is the depth value of each pixel in the depth panorama $D_1$; and in a spherical coordinate system, converting the latitude, longitude and depth values of each pixel into x, y and z coordinates in the camera coordinate system to generate point cloud $P_0$.

1.2) Converting the point cloud $P_0$ in the camera coordinate system to the world coordinate system based on a camera extrinsic parameter corresponding to the view $v_1$, and assigning the color information of RGB panorama $C_1$ and normal panorama $N_1$ to each point in the point cloud $P_0$ in the row column order of pixel points to generate initial point cloud $P_1$ with RGB information and initial point cloud $P_2$ with normal information.

Step 2: Selecting a New Occlusion Prediction View Based on the Initial Point Cloud 2.1) Encoding the initial point cloud $P_1$ by a truncated signed distance function (TSDF); dividing a selected 3D space to be modeled into a plurality of small blocks, and calling each small block as a voxel; storing, by the voxel, a distance value between the small block and a nearest object surface, and representing, by the symbol of the distance value, that the voxel is in a free space or a closed space; and conducting truncation processing if the absolute value of the distance value exceeds a set truncation distance D.

2.2) Assuming that a small voxel block corresponding to the view $v_1$ is $t_0$; updating the distance value of $t_0$ as 0; and updating the distance value of the small voxel block near $t_0$ according to a distance from $t_0$, wherein if the distance from $t_0$ is smaller, the decline of the distance value is larger.

2.3) Traversing each small voxel block to find a voxel block with the largest distance value; selecting the voxel block closest to a scene center if a plurality of voxel blocks have the same distance value; randomly selecting from the voxel blocks which satisfy conditions if the distance from the scene center is still the same; and taking the center of the selected voxel block as the position of view $v_2$ to obtain a translation matrix of the view $v_2$, with a rotation matrix of the view $v_2$ the same as a rotation matrix of the view $v_1$.

Step 3: Generating a Panorama Under the Selected View from the Initial Point Cloud 3.1) Converting the initial point cloud $P_1$ with RGB information and the initial point cloud $P_2$ with normal information in the world coordinate system to the camera coordinate system based on the camera extrinsic parameter corresponding to the view $v_2$.

3.2) In the spherical coordinate system, converting the x, y and z coordinates of each point in the point cloud $P_1$ and the point cloud $P_2$ respectively into latitude, longitude and radius, and corresponding to the pixel position of a 2D panorama; making the color of each point correspond to the pixel position; considering that occlusion is completed by point-to-point occlusion, which is inconsistent with the real world, increasing the influence range of each point; specifically, extending the calculated each pixel (x,y) outward to pixels (x+1,y), (x+1,y), (x,y+1) and (x+1,y+1); and copying the information carried by each pixel to the new pixels.

3.3) The problem that multiple points correspond to the same pixel exists when the pixels are merged into a panorama, and needs to be solved; firstly, initializing the depth value of each pixel of depth panorama $D_2$ to a maximum value 65535 that can be represented by an unsigned 16-bit binary number, and initializing the color value of each pixel of a RGB panorama $C_2$ and a normal panorama $N_2$ as a background color; then conducting the following operation on all the pixels generated in step 3.2: acquiring the position (x,y) of the pixel and the corresponding depth value, and comparing with the depth value at (x,y) in the depth panorama $D_2$; if the former depth value is smaller, updating the depth value at (x,y) in the depth panorama $D_2$ and the color values at (x,y) in the RGB panorama $C_2$ and the normal panorama $N_2$; if the latter depth value is smaller, keeping unchanged; and after all the updates are completed, obtaining the RGB panorama $C_2$, the depth panorama $D_2$ and the normal panorama $N_2$ rendered under the new view $v_2$.

Step 4: Generating Incomplete Point Cloud from the Panorama Under the Specific View 4.1) Generating point cloud $\tilde{P}_0$ from the depth panorama $D_2$, like step 1.1;

4.2) Calculating normal direction in the world coordinate system according to the normal panorama $N_2$, and converting the normal direction in the world coordinate system to the camera coordinate system according to the camera extrinsic parameter corresponding to the view $v_2$ (note: the normal panorama $N_2$ is rendered in the camera coordinate system corresponding to the view $v_2$, but the color of the normal panorama records the normal direction in the world coordinate system).

4.3) The incompletion of the scene is mainly caused by occlusion, but partly caused by the view; for example, if a plane on a table is viewed at an approximate horizontal angle, the projected point cloud is striped; therefore, in the process of 2D-3D equirectangular projection, angle masks need to be calculated to locate a stripe area, so that a scene point cloud completion network can especially complete a real occlusion area; a specific implementation solution is: calculating each point in the point cloud $\tilde{P}_0$ in the camera coordinate system; denoting a vector represented by a connecting line from an origin to a point in $\tilde{P}_0$ as $\vec{n}_1$; denoting the vector of the point in a corresponding order (a row column order) calculated from the normal panorama $N_2$ as $\vec{n}_2$; calculating an angle $\alpha$ between the vector $\vec{n}_1$ and the vector $\vec{n}_2$; then calculating the difference values between the angle $\alpha$ and 90° to obtain absolute values; and filtering the points with the absolute value of less than 15° as the angle masks.

4.4) Converting the point cloud $\tilde{P}_0$ in the camera coordinate system to the world coordinate system based on the camera extrinsic parameter corresponding to the view $v_2$, and assigning the color information of the RGB panorama $C_2$ and normal panorama $N_2$ to each point in the point cloud $\tilde{P}_0$ in the row column order of the pixel points to generate incomplete point cloud $P_3$ with RGB information and incomplete point cloud $P_4$ with normal information.

Step 5: Constructing a Self-Supervised Learning Dataset

Taking the incomplete point cloud $P_3$ with RGB information, the incomplete point cloud $P_4$ with normal information and the angle masks as input for the training of the scene point cloud completion network, wherein the targets of the scene point cloud completion network are incomplete point cloud $P_1$ with RGB information and incomplete point cloud $P_2$ with normal information; thus, generating self-supervised learning data pairs for scene point cloud completion, and then constructing the self-supervised learning dataset.

The Present Invention has the Following Beneficial Effects:

(1) Simplification of the collection mode of the point cloud data in the real scene. No complex and tedious scene collection is required. The present invention can generate a dataset applicable to training of the scene point cloud completion network with panoramas as input.

(2) Occlusion prediction idea of view conversion. Compared with the limited field of view of pinhole cameras, the panoramas essentially support the change of the view, and then are combined with the occlusion prediction idea based on view conversion, so as to actually simulate the incompletion distribution of the scene point cloud and further support the completing of the scene point cloud completion task by self-supervised learning.

(3) Design of view selection strategy. The selection of the view affects the predicted occlusion distribution. If the predicted occlusion area is small, it is difficult for the network to learn effective information. If the predicted occlusion area is too large or similar to the incompletion of the original point cloud, the difficulty of completion is greatly increased. Based on the above problems, the present invention proposes a selection strategy of occlusion prediction views, which can effectively select the views by means of TSDF expression to assist in completing the scene completion task.

DETAILED DESCRIPTION

Specific embodiments of the present invention are further described below in combination with accompanying drawings and the technical solution.

The present invention is based on the 2D-3D-Semantics dataset published by Stanford University. The dataset involves six large indoor areas which are derived from three different buildings that focus on education and office. The dataset contains 1413 equirectangular RGB panoramas, as well as corresponding depth maps, surface normal maps, semantic annotation maps and camera metadata, which are sufficient to support the dataset generation method for self-supervised learning scene point cloud completion based on panoramas proposed by the present invention. In addition, other equirectangular panoramas taken or collected are also applicable to the present invention.

Figure 1:
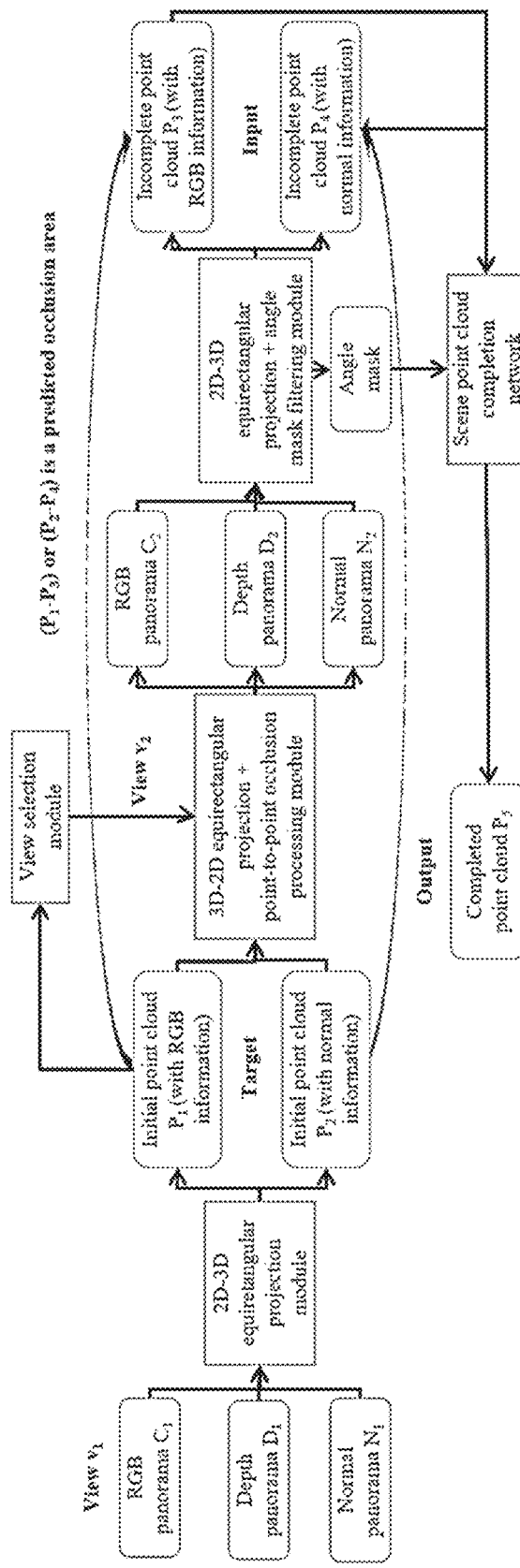
FIG. 1 is a flow chart of an entire frame.

The present invention comprises four main modules: a 2D-3D equirectangular projection module, a view selection module, a 3D-2D equirectangular projection and point-to-point occlusion processing module and a 2D-3D equirectangular projection and angle mask filtering module, as shown in FIG. 1. Firstly, the 2D-3D equirectangular projection module takes the RGB panorama $C_1$, the depth panorama $D_1$ and the normal panorama $N_1$ under the view $v_1$ as input to generate initial point cloud $P_1$ with RGB information and initial point cloud $P_2$ with normal information. Secondly, the view selection module takes the initial point cloud $P_1$ as input to generate a new occlusion prediction view $v_2$. Thirdly, the 3D-2D equirectangular projection and point-to-point occlusion processing module takes the initial point cloud $P_1$, the initial point cloud $P_2$ and the view $v_2$ as input to generate the RGB panorama $C_2$, the depth panorama $D_2$ and the normal panorama $N_2$ under the view $v_2$. Fourthly, the 2D-3D equirectangular projection and angle mask filtering module takes the RGB panorama $C_2$, the depth panorama $D_2$ and the normal panorama $N_2$ under the view $v_2$ as input to generate incomplete point cloud $P_3$ with RGB information, incomplete point cloud $P_4$ with normal information and angle masks for filtering the stripe area. Finally, the generated incomplete point cloud $P_3$, incomplete point cloud $P_4$ and angle masks can be delivered into a scene point cloud completion network; and the completed point cloud $P_5$ is generated. The incomplete point cloud $P_3$ (input) and the initial point cloud $P_1$ (target) or the incomplete point cloud $P_4$ (input) and the initial point cloud $P_2$ (target) can be used as self-supervised learning data pairs.

Figure 2:
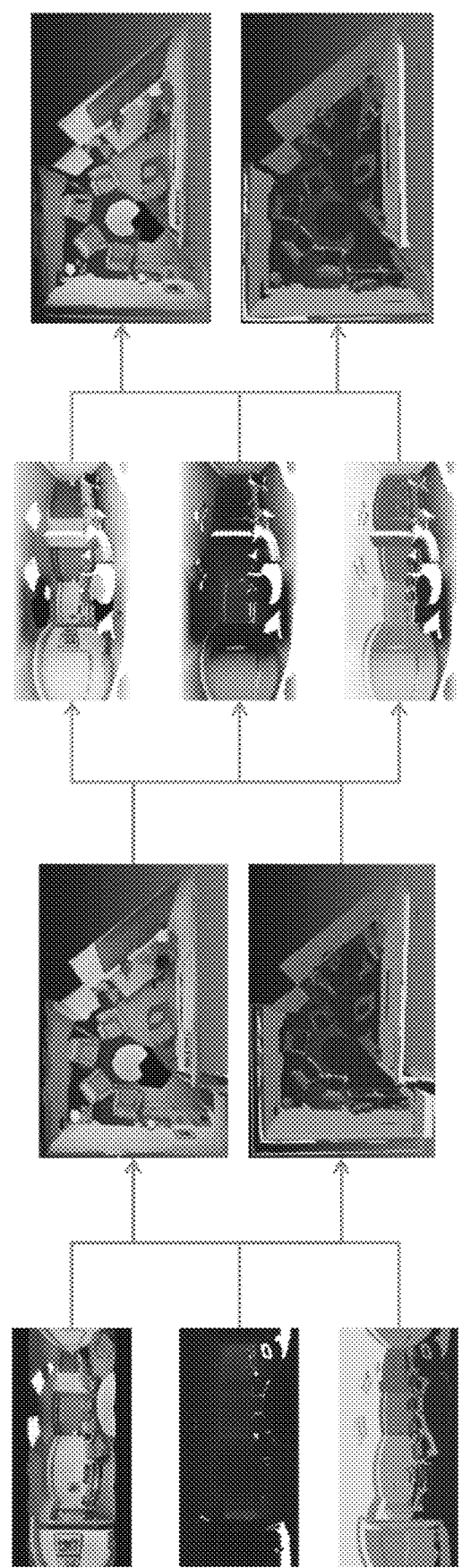
FIG. 2 is a visual effect diagram of an intermediate result example.

FIG. 2 shows the visual effect of an intermediate result example, and shows the RGB panorama $C_1$, the depth panorama $D_1$ and the normal panorama $N_1$ under the view $v_1$, and the RGB panorama $C_2$, the depth panorama $D_2$ and the normal panorama $N_2$ under the view $v_2$, the incomplete point cloud $P_3$ and the incomplete point cloud $P_4$.

Figure 3:
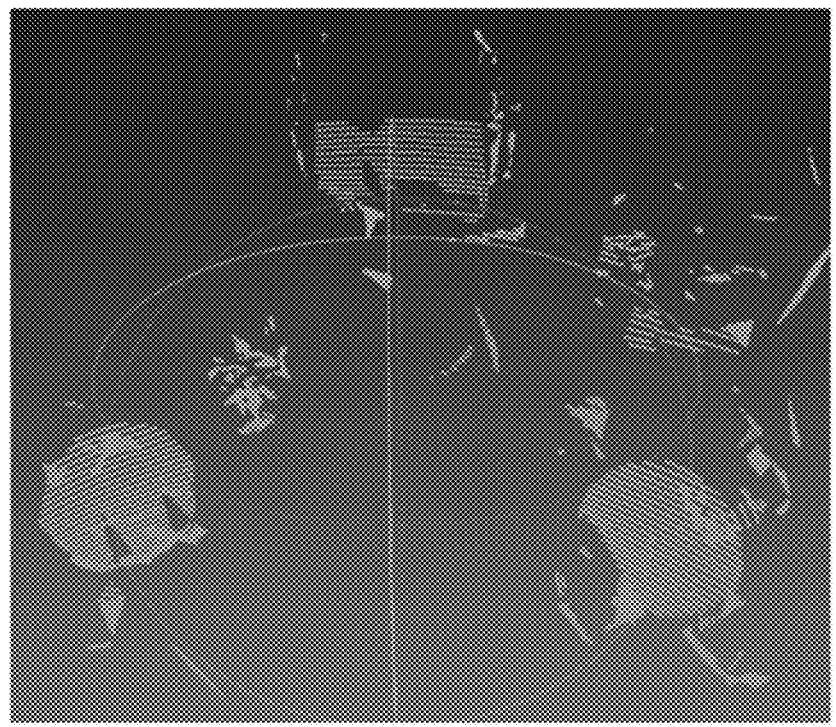
FIG. 3 is a visual effect diagram of an angle mask example.

FIG. 3 shows the visual effect of an angle mask example, and shows angle masks generated by viewing a plane on a table at an approximate horizontal angle. It can be seen that the filtered area is striped, which can effectively solve the problem of point cloud incompletion caused by views.

The invention claimed is:

1. A dataset generation method for self-supervised learning scene point cloud completion based on panoramas, comprising the following steps:

step 1: generating initial point cloud from a panorama under a specific view by:
  1.1) representing a three-dimensional world by a sphere, and representing coordinates in x, y and z directions by longitude and latitude, wherein a radius r of the sphere represents a depth value; assuming that a length of a depth panorama $D_1$ is a same as a range of −180° to 180° in a horizontal direction of a scene, and a width of the depth panorama $D_1$ corresponds to a range of −90° to 90° in a vertical direction; representing a coordinate of each pixel of the depth panorama $D_1$ with the longitude and the latitude, wherein a radius of a point in the sphere corresponding to each pixel is a depth value of each pixel in the depth panorama $D_1$; and in a spherical coordinate system, converting the latitude, longitude and depth values of each pixel into x, y and z coordinates in a camera coordinate system to generate point cloud $P_0$;
  1.2) converting the point cloud $P_0$ in the camera coordinate system to a world coordinate system based on a camera extrinsic parameter corresponding to a view $v_1$, and assigning a color information of a RGB panorama $C_1$ and a normal panorama $N_1$ to each point in the point cloud $P_0$ in a row column order of pixel points to generate initial point cloud $P_1$ with RGB information and initial point cloud $P_2$ with normal information;

step 2: selecting a new occlusion prediction view based on the initial point cloud $P_1$ and $P_2$ by:
  2.1) encoding the initial point cloud $P_1$ by a truncated signed distance function; dividing a selected 3D space to be modeled into a plurality of blocks, and calling the block as a voxel; storing, by the voxel, a distance value between the block and a nearest object surface, and representing, by a symbol of the distance value, that the voxel is in a free space or a closed space; and conducting truncation processing if an absolute value of the distance value exceeds a set truncation distance D;

2.2) assuming that a voxel block corresponding to the view $v_1$ is $t_0$; updating a distance value of $t_0$ as 0; and updating the distance value of the voxel block near $t_0$ according to a distance from to, wherein if a distance from to is smaller, a decline of the distance value is larger;

2.3) traversing each voxel block to find a voxel block with the largest distance value; selecting the voxel block closest to a scene center if a plurality of the voxel blocks have a same distance value; randomly selecting from the voxel blocks which satisfy conditions if a distance from a scene center is still the same; and taking a center of a selected voxel block as a position of view $v_2$ to obtain a translation matrix of the view $v_2$, with a rotation matrix of the view $v_2$ the same as a rotation matrix of the view $v_1$;

step 3: generating a panorama under the view $v_2$ from the initial point cloud $P_1$ and $P_2$ by:

3.1) converting the initial point cloud $P_1$ with the RGB information and the initial point cloud $P_2$ with normal information in the world coordinate system to the camera coordinate system based on a camera extrinsic parameter corresponding to the view $v_2$;

3.2) in the spherical coordinate system, converting the x, y and z coordinates of each point in the point cloud $P_1$ and the point cloud $P_2$ respectively into latitude, longitude and radius, and corresponding to a pixel position of a 2D panorama; making a color of each point correspond to the pixel position; increasing an influence range of each point, specifically, extending a calculated each pixel (x,y) outward to pixels (x,y), (x+1,y), (x,y+1) and (x+1,y+1); and copying a information carried by each pixel to a new pixels;

3.3) firstly, initializing a depth value of each pixel of depth panorama $D_2$ to a value 65535 that is represented by an unsigned 16-bit binary number, and initializing a color value of each pixel of a RGB panorama $C_2$ and a normal panorama $N_2$ as a background color; then conducting a following operation on all the pixels generated in step 3.2): acquiring a position of the pixel (x,y) and a corresponding depth value, and comparing with the depth value at the pixel (x,y) in the depth panorama $D_2$; if a former depth value is smaller, updating the depth value at (x,y) in the depth panorama $D_2$ and a color value at (x,y) in the RGB panorama $C_2$ and a normal panorama $N_2$; if a latter depth value is smaller, keeping unchanged; and after all updates are completed, obtaining the RGB panorama $C_2$, the depth panorama $D_2$ and the normal panorama $N_2$ rendered under a new view $v_2$;

step 4: generating incomplete point cloud from the panorama under a specific view by:

4.1) generating point cloud $\tilde{P}_0$ from the depth panorama $D_2$;

4.2) calculating normal direction in the world coordinate system according to the normal panorama $N_2$, and converting the normal direction in the world coordinate system to the camera coordinate system according to the camera extrinsic parameter corresponding to the view $v_2$, wherein the normal panorama $N_2$ is rendered in the camera coordinate system corresponding to the view $v_2$, but a color of the normal panorama records the normal direction in the world coordinate system;

4.3) in a process of 2D-3D rectangular projection, angle masks need to be calculated to locate a stripe area, so that a scene point cloud completion network completes a real occlusion area; calculating each point in the point cloud $\tilde{P}_0$ in the camera coordinate system; denoting a vector represented by a connecting line from an origin to a point in $\tilde{P}_0$ as $\vec{n}_1$; denoting a vector of a point in a row column order calculated from the normal panorama $N_2$ as $\vec{n}_2$; calculating an angle $\alpha$ between the vector $\vec{n}_1$ and the vector $\vec{n}_2$; then calculating difference values between the angle $\alpha$ and 90° to obtain absolute values; and filtering points with the absolute value of less than 15° as angle masks;

4.4) converting the point cloud $\tilde{P}_0$ in the camera coordinate system to the world coordinate system based on the camera extrinsic parameter corresponding to the view $v_2$, and assigning the color information of the RGB panorama $C_2$ and the normal panorama $N_2$ to each point in the point cloud $\tilde{P}_0$ in the row column order of the pixel points to generate incomplete point cloud $P_3$ with RGB information and incomplete point cloud $P_4$ with normal information; and step 5: constructing a self-supervised learning dataset by: taking the incomplete point cloud $P_3$ with RGB information, the incomplete point cloud $P_4$ with normal information and the angle masks as input for the training of a scene point cloud completion network, wherein the targets of the scene point cloud completion network are incomplete point cloud $P_1$ with RGB information and incomplete point cloud $P_2$ with normal information.

* * * * *